United States Patent
Fontana et al.

(10) Patent No.: US 7,500,227 B1
(45) Date of Patent: Mar. 3, 2009

(54) PROCESS AND SYSTEM FOR INTERCEPTING A .NET METHOD AT RUNTIME

(75) Inventors: James Albert Fontana, Mission Viejo, CA (US); Mark Jeffrey Tadman, Mission Viejo, CA (US); Jack Ju-Qing Chang, Irvine, CA (US); Viraj Byakod, Aliso Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 800 days.

(21) Appl. No.: 10/873,826

(22) Filed: Jun. 22, 2004

(51) Int. Cl.
*G06F 9/44* (2006.01)
(52) U.S. Cl. ...................... 717/127; 717/130
(58) Field of Classification Search ......... 717/169–173, 717/100–168; 709/203
See application file for complete search history.

(56) References Cited

U.S. PATENT DOCUMENTS

| | | | | |
|---|---|---|---|---|
| 6,490,721 B1* | 12/2002 | Gorshkov et al. | ............ | 717/130 |
| 6,760,903 B1* | 7/2004 | Morshed et al. | ............. | 717/130 |
| 6,789,225 B2* | 9/2004 | Dorney et al. | ............... | 714/752 |
| 6,964,042 B2* | 11/2005 | Lagergren | .................... | 717/153 |
| 6,981,250 B1* | 12/2005 | Wiltamuth et al. | .......... | 717/170 |
| 7,089,548 B2* | 8/2006 | Lin | ............................ | 717/168 |
| 7,114,148 B2* | 9/2006 | Irving et al. | ................ | 717/121 |
| 7,117,184 B1* | 10/2006 | Fontana et al. | ................. | 706/1 |
| 7,165,247 B2* | 1/2007 | Plummer | .................... | 717/168 |
| 7,210,143 B2* | 4/2007 | Or et al. | ...................... | 717/174 |
| 7,219,329 B2* | 5/2007 | Meijer et al. | ................ | 717/106 |
| 7,222,341 B2* | 5/2007 | Forbes et al. | ................ | 717/170 |
| 7,249,174 B2* | 7/2007 | Srinivasa et al. | ............ | 709/223 |
| 7,263,686 B2* | 8/2007 | Sadiq | ......................... | 717/110 |
| 7,275,087 B2* | 9/2007 | Vaschillo et al. | ............ | 709/218 |
| 7,281,245 B2* | 10/2007 | Reynar et al. | ............... | 717/173 |
| 7,287,247 B2* | 10/2007 | Gschwind et al. | ........... | 717/130 |
| 2004/0268301 A1* | 12/2004 | Kaston | ....................... | 717/108 |
| 2005/0091671 A1* | 4/2005 | Deem et al. | ................. | 719/328 |
| 2005/0102321 A1* | 5/2005 | David et al. | ............. | 707/104.1 |
| 2005/0114848 A1* | 5/2005 | Choi et al. | .................. | 717/148 |
| 2005/0172133 A1* | 8/2005 | Brumme et al. | ............ | 713/182 |
| 2005/0257196 A1* | 11/2005 | Hollander et al. | ........... | 717/115 |

OTHER PUBLICATIONS

Hunt, "Intercepting and Instrumenting COM Applications", May, 1999, 5th USENIX Conference on Object-Oriented Technologies and Systems (COOTS '99), pp. 1-13.*
Brown, "Building a Lightweight COM Interception Framework", Jan. 1999, Microsoft Systems Journal, pp. 1-12.*
Microsoft, What Is The Microsoft .NET Framework?, May 12, 2003.
Microsoft, Microsoft .NET Glossary A-Z, May 14, 2003.
Microsoft, What .NET Means for Business, May 25, 2001.
Microsoft, What .NET Means for IT Professionals, Jul. 24, 2002.

* cited by examiner

*Primary Examiner*—Wei Y Zhen
*Assistant Examiner*—Chih-Ching Chow
(74) *Attorney, Agent, or Firm*—James Goepel; Alfred W. Kozak; Robert P. Marley (57) ABSTRACT

The present invention is a process for intercepting a .NET™ method at runtime in order to enable modifying the method in order to capture data about the method, trace the method, modify the method's behavior, enforce constraints, modify the method's parameters and/or return, throw (halt method execution and let the user know that an error has occurred) user-defined exceptions, and in any other manner to affect the runtime behavior of the application without having to modify and re-deploy the application.

5 Claims, 6 Drawing Sheets

Flowchart for enabling a .NET method to be Intercepted

Before Interception

Fig. 1A

After Interception

Application's method metadata table

| Token | Name | RVA | Flags | ImplFlags | Signature | ParamList |
|---|---|---|---|---|---|---|
| 0X06000001 | GetBalance | 0X1000 | 0X96 | 0X0 | 0X12345 | 0X4504 |
| 0X06000002 | Withdraw | 0X2000 | 0X96 | 0X0 | 0X12345 | 0X4504 |
| 0X06000003 | Deposit | 0X3000 | 0X96 | 0X0 | 0X12345 | 0X4504 |

*Fig. 3*

Diagram for intercepting a .NET method at runtime

Before Interception

Caller Application    Called Application

Fig. 4A

Enabling Interception

Caller Application    Called Application

After Interception

Fig. 4D

Fig. 5

PROCESS AND SYSTEM FOR INTERCEPTING A .NET METHOD AT RUNTIME

CROSS REFERENCES TO RELATED CASES

This application is also related to co-pending application U.S. Ser. No. 10/714,342 entitled "Method For Dynamically Injecting User-Defined Behavior Into A Microsoft COM+ Binary Component", which is incorporated herein by reference. This application has been abandoned.

This application is also related to co-pending application U.S. Ser. No. 10/738,785 entitled "System And Method For Conditioning Component-Based Applications", which is incorporated herein by reference.

This application is also related to co-pending application U.S. Ser. No. 10/849,412 entitled "System And Method For Modifying A .NET Method's Behavior Non-Intrusively At Runtime By Injecting User-Defined Behavior", which is incorporated herein by reference.

BACKGROUND OF THE INVENTION

1. Field of the Invention

The present invention generally relates to the interception of a .NET™ method at runtime in order to modify or augment a method.

2. Description of Related Art

Extending a runtime .NET™ application cannot be done without modifying the application and redeploying the application. Also to modify the application at runtime, it is necessary to be able to intercept the .NET™ methods in the application. It is therefore necessary to devise a method in which the .NET™ methods can be intercepted. It should be noted that in the .NET™ platform an application cannot be modified unless the presently described process is applied.

Also of background interest are the .NET publications of Microsoft Corporation designated as:

"What is the Microsoft .NET™ Framework", dated May 14, 2003 and published by the Microsoft Corporation.

SUMMARY OF THE INVENTION

An embodiment of the invention is the ability to intercept a .NET™ method.

The method of the present invention solves the problem of inability to intercept a .NET™ method in order to modify the methods behavior. The present invention here solves this problem by extending the .NET™ application at runtime. It is important to note that extending the .NET™ application means augmenting or modifying the application non-intrusively, i.e. without modifying the source code of the application.

Figure 4A:
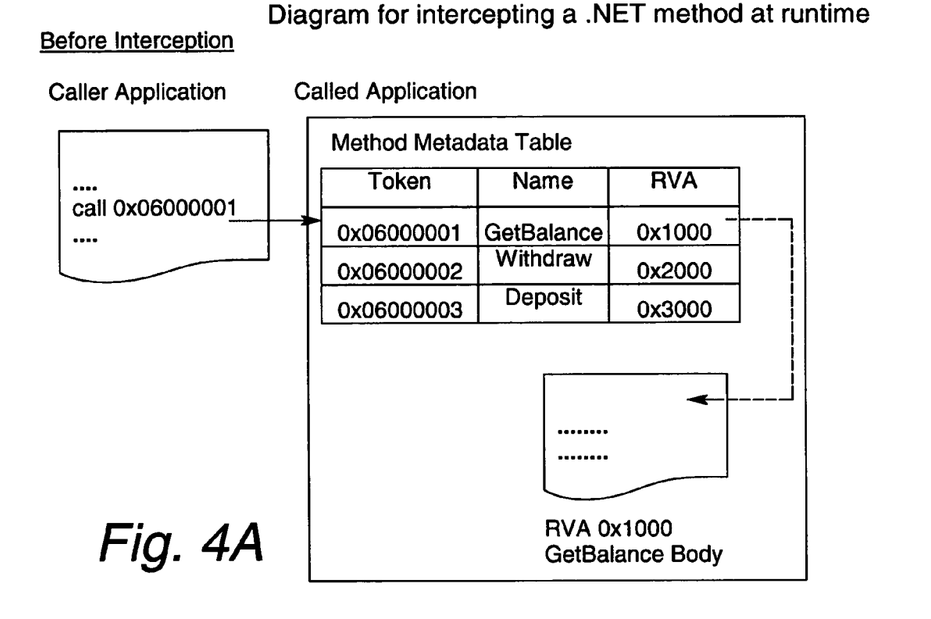
FIGS. 4A, 4B & 4C are drawings showing the enabling of interception of a .NET™ application at runtime.

This is accomplished by locating a .NET™ application in an associated module, then selecting a chosen method to be intercepted. A proxy for the chosen method is defined and then a "new method body" is created for the method to be intercepted. The method's new body is made to call the proxy. Apart from that, additional code be added for an interception, which will modify the method, capture information about the method, trace the method (go through method step by step) as shown in FIGS. 4A,B,C and 4D, modify behavior of the method, enforce constraints (restrictions) or modify parameters of the method.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY ITEMS

1. Interception: the ability to extend (modify or augment the application non-intrusively) the runtime of the method call.
2. Runtime Environment: is the Microsoft's CLR (Common Language Runtime) which is the runtime engine for .NET applications.
3. Method: A business service operation provided by a .NET application, such as "requesting a bank balance" or "making a bank deposit". In the context of this patent, a method can be anything, namely: method, event, property, constructor, destructor and so on.
4. Method Call: A call from one program to another. An example of a method call could be "getting a customers bank balance."
5. NET Application: is any program that is targeted by the Microsoft's CLR (Common Language Runtime)
6. Interceptor: The program that enables interception.
7. Proxy: An intermediary program that acts as both a server and a client for the purpose of making requests on behalf of other clients. Proxies are often used as client-side portals (i.e., a trusted agent that can access the Internet on the client's behalf) through the network firewall and as helper applications for handling requests via protocols not implemented by the user agent. A software agent, often a firewall mechanism, which performs a function or operation on behalf of another application or system while hiding the details involved.
8. Enabling the method for interception: Allowing the method to be intercepted.
9. Method body: The portion of a method that contains executable statements. When a method is invoked (on a list of arguments), its body is executed within the scope of the parameter bindings, i.e., with the parameter names bound to the corresponding arguments.

10. Runtime: the period of time during which a program is being executed, as opposed to compile time or load time. Can also refer to the runtime environment, which designates the set of conventions that arbitrate how software is generated into executable code, how code is mapped into memory, and how functions call one another.

11. NET Runtime Profiler: A code profiler is a software tool, implemented as a DLL, which is called by the runtime system during the execution of an image. The profiler receives notifications each time a function is entered or exited, as well as when other events occur that are of interest to the programmer. By gathering statistics on these events, a profiler can build a comprehensive picture of which routines used the most CPU time, when garbage collections occurred, if exceptions were thrown, and so on.

12. IL Code: IL Assembly language which can be used to debug your .NET™ code (written in any .NET™ high level language) at low level. IL itself is in the binary format which means it can't be read by the human. But as other binary (executable) code have an assembly language, so the same way IL also has an assembly language known as IL Assembly (ILAsm). IL Assembly has the instruction in the same way as that the native assembly language have. Like, to add two numbers, you have "add" instruction, to subtract two numbers, you have "sub" instruction etc.

13. Tracing the method: Going through the method one step at a time.

14. Modifying a method's parameters: Changing colleague variables that are set to one of a number of valid values. Changing parameters will cause a Colleague module to function differently, and allow an instruction to set up controls and options to meet their individual needs.

15. Throwing User-Defined exceptions: Many kinds of errors can cause exceptions—problems ranging from serious hardware errors, such as a hard disk crash, to simple programming errors, such as trying to access an out-of-bounds array element. When such an error occurs within a Java method, the method creates an exception object and hands it off to the runtime system. The exception object contains information about the exception, including its type and the state of the program when the error occurred. The runtime system is then responsible for finding some code to handle the error. In Java terminology, creating an exception object and handing it to the runtime system is called throwing an exception.

DETAILED DESCRIPTION

One major embodiment of the invention is a process for intercepting a .NET method for the purpose of enabling method modification in order to collect runtime performance data for analysis, for tuning, for optimization, for modification of method parameters, modification of method return and other purposes.

Figure 1A:
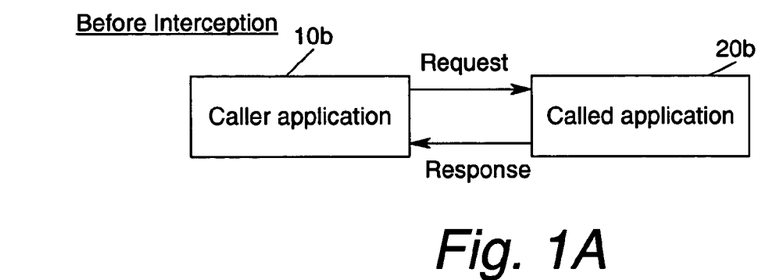
FIG. 1A is a diagram illustrating a normal .NET™ application runtime environment.
Figure 1B:
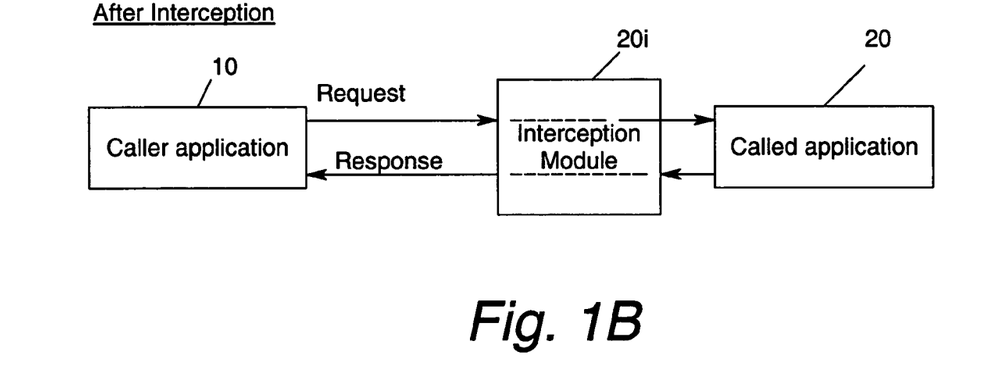
FIG. 1B illustrates a .NET™ application runtime environment which is now enabled for interception.

The functionality provided by the "Interception Module", 20i, FIG. 1B, includes the ability to intercept a method at runtime.

Figure 5:
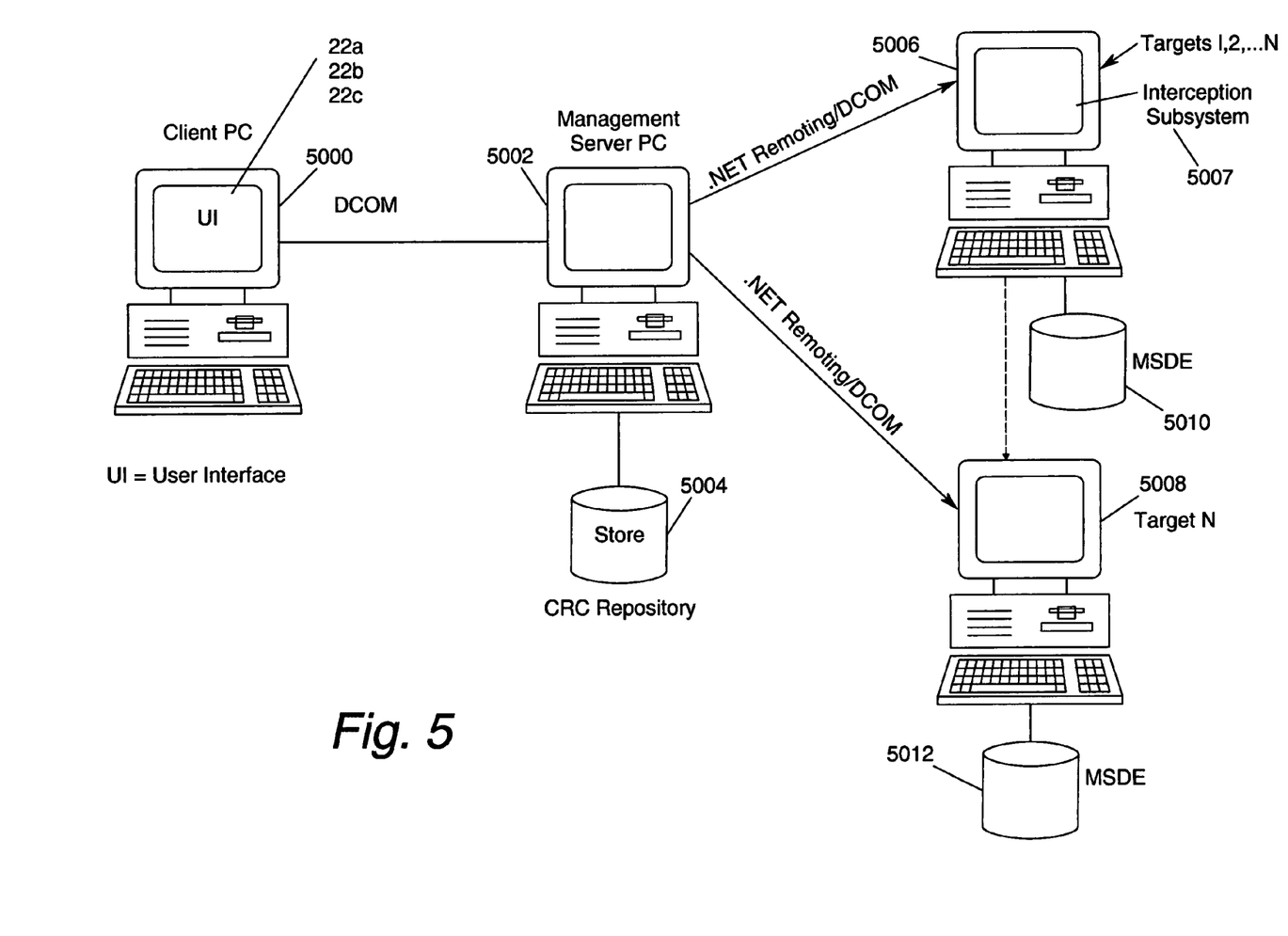
FIG. 5 is a diagram of the operating modules involved for intercepting a .NET™ method.

Reference to the cited U.S. Ser. No. 10/849,412 will further define and illustrate the following, re FIG. 5:

FIG. 5 illustrates the working environment of the modules used in runtime conditioning. A client i.e. block 5000 (personal computer, mobile device etc), has the conditioning tool user interface (UI) to apply the conditioners (22a, 22b, 22c in FIG. 5) to the methods of a .NET™ application. Using the client 5000, the user can discover the .NET™ applications on remote machines 5006 (targets 1,2, . . . N) and then apply, remove, start, or stop conditioners to the chosen .NET™ application. The methods and the applied conditioners' information are stored by the conditioning tool on the chosen target machine 5006.

A Management Server i.e. block 5002 is the machine through which the communication is done with remote machines (targets 1,2, . . . N). The management server 5002 stores information i.e. in CRC Repository block 5004 about .NET™ applications that have been chosen by the client for conditioning. The management server 5002 also stores information about the conditioners available and the conditioners which are applied to a method in a .NET™ application.

An RPC (Remote Procedure Call) mechanism is used to communicate between the client 5000, Management Server 5002 and the targets in 5006. A target i.e. blocks 1,2, . . . N, shown in 5006, is the machine of interest. The .NET™ applications on a target in 5006 are chosen to be conditioned. It is this machine 5006 that needs to be conditioned and is chosen by the client, 5000. There can be any number of targets 1,2,N involved. The target machine 5006 needs to contain the interception and conditioning infrastructures 20i in order to apply the conditioning. The targets in 5006 contain a datastore 5010, which contains information about method's and the conditioners applied on them. Module Item 5007 is the interception module. It should be noted that Items 5007-5012 are all target machines. 5010 and 5012, specifically, are databases, and 5008 is the target machine where interception is to take place.

Now referring to FIG. 1A, FIG. 1A illustrates a sketch of a .NET™ runtime system before the instigation of the present invention. FIG. 1A is a drawing illustrating how a typical .NET™ system would normally respond to a caller's request. As seen in FIG. 1A, the caller application 10b will send a request to the called application 20b, after which the called application 20b will return a response back to the caller application 10b.

In a .NET™ runtime environment, when a caller makes a request to the callee (the called application), the callee 20b processes the request by reading the parameters. In the method public int getBalance(int account), account is a parameter, if any, sent in by the caller 10b, then executing the method and returning the data (if any) back to the caller 10b. Note that the caller application and the called application could possibly be one and the same i.e. communication within the application.

FIG. 1B illustrates an improved arrangement in a diagram for intercepting a .NET™ method at runtime. Referring to FIG. 1B, the caller application 10 sends a request to the called application 20 via Interception Module 20i that forwards the request to the "called application," 20. At this point, the called application 20 has no ability to intercept the request. But now, the called application, 20, receives the request from the called application 10, processes the request, and sends the response back to the Interception Module 20i. At this point, the Interception Module 20i can "intercept" the response, after which the response is transmitted back to the caller application, 10.

Figure 2:
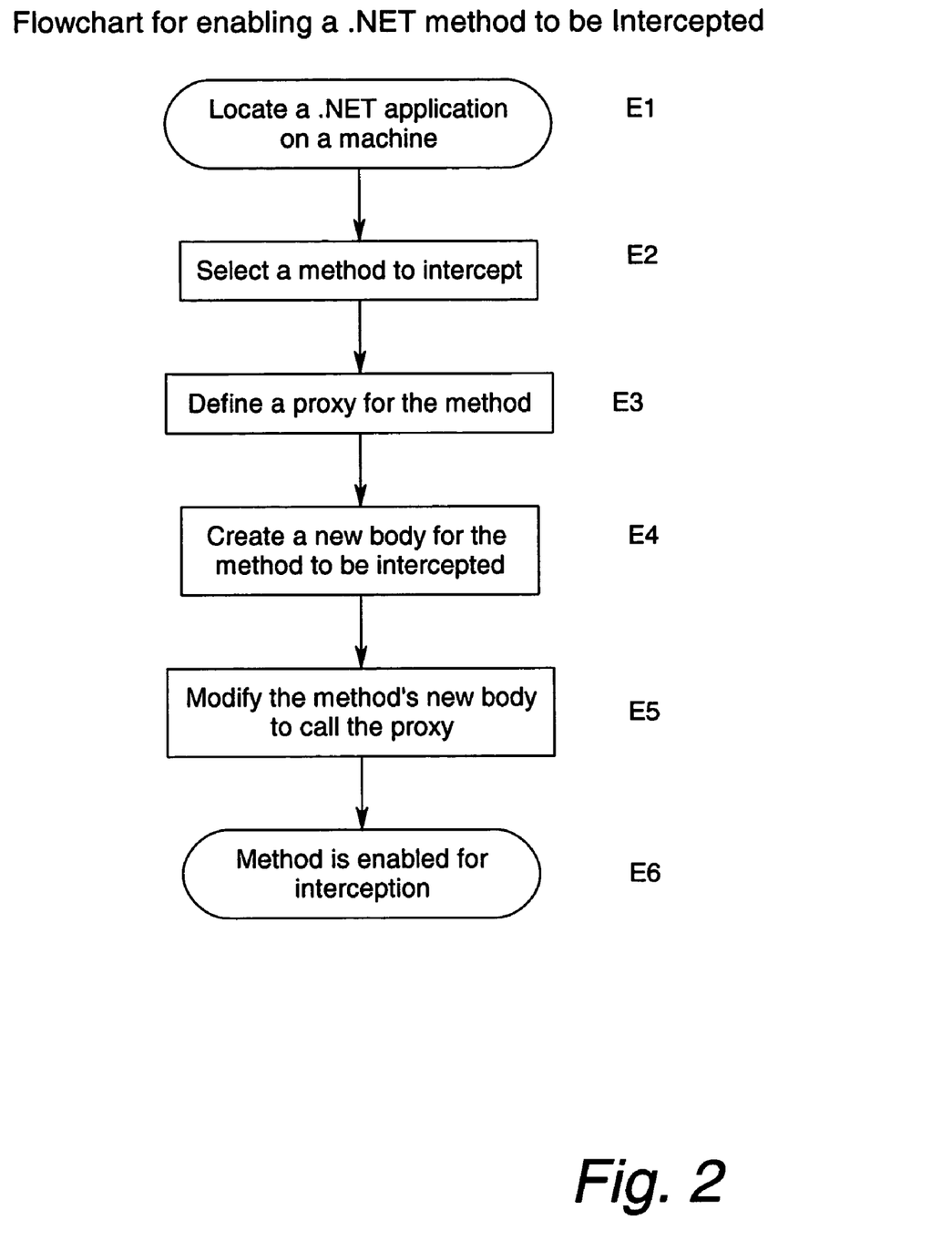
FIG. 2 is a flowchart that illustrates the process of enabling a .NET™ method to be intercepted.

FIG. 2 shows a flow chart for enabling a .NET™ method to be intercepted. The process of enabling interception consists of the following steps:

E1) locate a .NET™ application on a machine.

E2) select the particular chosen method in the .NET™ application for interception.

E3) define proxies for the methods chosen to be intercepted. Note that a proxy is a substitute for the original object and is a standard computer science operation.

E4) create a new body (method) for the methods chosen to be intercepted.

E5) the method's new body is modified to call the proxies.

E6) enable the method for interception.

As a specific example, lets say that we have a .NET™ application called "BankApplication.exe" which contains the methods getBalance, withdraw and deposit. Step E1 (FIG. 2) would mean locating this application on disk. E2 means choosing, lets say, method "getBalance" to be intercepted. Step E3 means creating new method getBalanceProxy. Step E4 means adding code to the newly created method. Step E5 means making getBalance call to getBalanceProxy.

It should be noted that the example listed below is only an example to illustrate how one would do the aforementioned tasks with an operation for "getting a bank balance."

Example: here the getBalance method is modified to have higher thread priority.

```
Public int getBalance(int account)
{
    Balance=GetBalanceFromDatabase( );
    return balance;
}
``` is modified to,

```
public int getBalance(int account)
{
    int threadPriority=Thread.getPriority( );
    Thread.SetPriority(MAX_VALUE);
    Balance=GetBalanceFromDatabase( );
    Thread.setPriority(threadPriority);
    return Balance;
}
```

Figure 3:
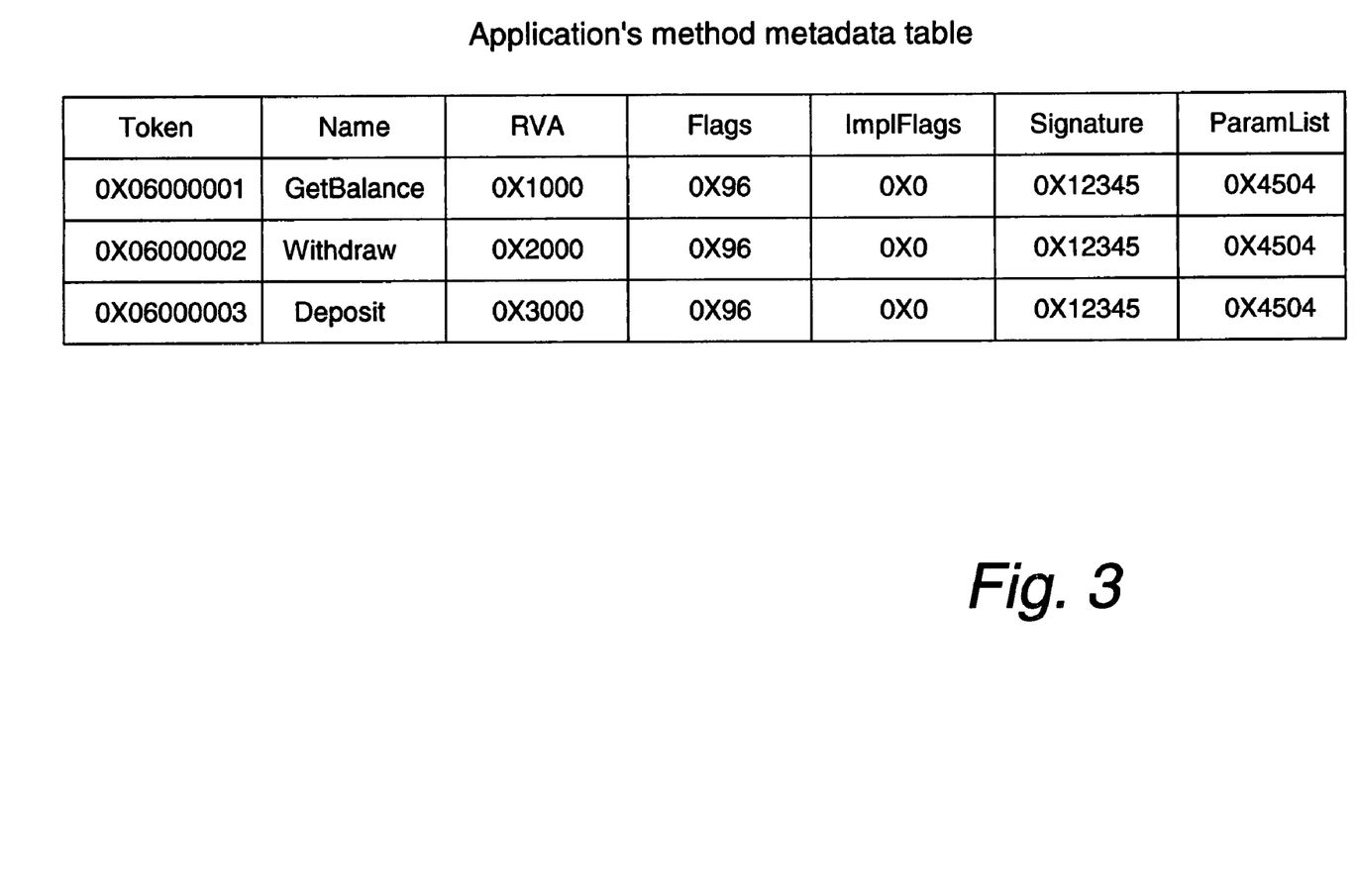
FIG. 3 is a drawing showing further details of the .NET™ application runtime operations.

Referring to FIG. 3, every .NET™ application consists of a method metadata table that stores information about each of the methods in the application and their properties. This metadata table is found in the installed application, for example the BankApplication.exe. At runtime this metadata table is loaded into memory. It should be noted that the aforementioned memory is referring to the memory of .NET™ runtime. The method metadata table consists of rows of methods and their properties. Each method or each row in the metadata table consists of the following properties:

1) Token: a 4-byte value representing the method. This is what is stored in the caller application's code and not the method name.
2) Name: the name of the method.
3) RVA (Relative Virtual Address): is the address of the method body. This is the address of the code of this method.
4) Flags: indicates the method's accessibility and other characteristics.
5) Imp1Flags: gives specifics of method implementation.
6) Signature: describes the method signature in bytes.
7) Param list: list of the parameters of the method.

Referring to FIG. 3, at runtime when a method in the module is called (say for e.g. method token 0x06000001 i.e. GetBalance which is a 4 byte token), the CLR (Common Language Runtime) looks at the metadata table and finds the method GetBalance. Then the CLR looks at the RVA of the method (in this case 0x1000) to find the method body, locates the method body using the RVA and runs the method body.

The following text describes the working of a .NET™ application runtime in more detail. This is descriptive for the exposition of FIGS. 4A, 4B, 4C and 4D:

The following discussion on Interception Module (FIG. 1B, 20i) will help illustrate FIGS. 4A, 4B, 4C & 4D:

The Interceptor 20i is developed using the Microsoft Profiling API. The Interception Module defines events published by the .NET™ runtime i.e. CLR (Common Language Runtime). There are events like module loads, method compiles etc. At runtime the CLR notifies the Interception Module whenever there is an event like a module load, a method called, a method compiled etc. Since the Interception Module is notified of these events, it has the opportunity to intercept. To enable the Interception Module to be notified of events by the CLR on a machine, it has be registered on the machine (any machine) and certain environment settings have to be set.

FIG. 4A illustrates a diagram showing the runtime of a .NET™ method. Referring to the FIG. 4A, the caller application 10 is calling the method token 0x06000001 i.e. GetBalance that exists in the called application 20. The CLR (Common Language Runtime) looks and finds the method 0x06000001 and using its RVA (Relative Virtual Address) i.e. 0x1000, locates the method body and executes the instructions in the body.

Figure 4B:
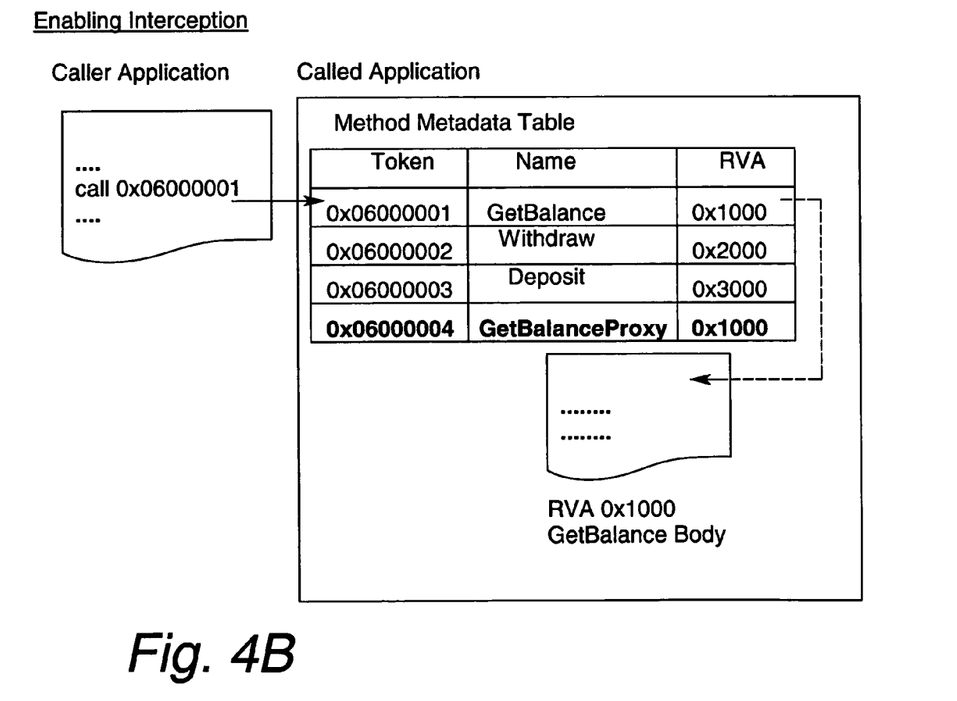

The process of enabling interception on the method GetBalance (FIG. 4A) consists of two steps: designated (i) and (ii):

(i) Defining a proxy method for the method (i.e. GetBalance) being intercepted:

Referring to FIG. 4B, in order to intercept the method 0x06000001 (i.e. GetBalance), then a proxy method GetBalanceProxy is defined at runtime using the Interception Module 20i which gets added to the metadata table as shown in FIG. 4B. The new method GetBalanceProxy (FIG. 4B) resembles the method GetBalance except for the name and gets assigned a new token by the CLR i.e. 0x06000004. Hence both GetBalanceProxy and GetBalance have the same RVA now i.e. 0x1000. So technically, if called, they will run the same set of instructions and produce the same results.

Figure 4C:
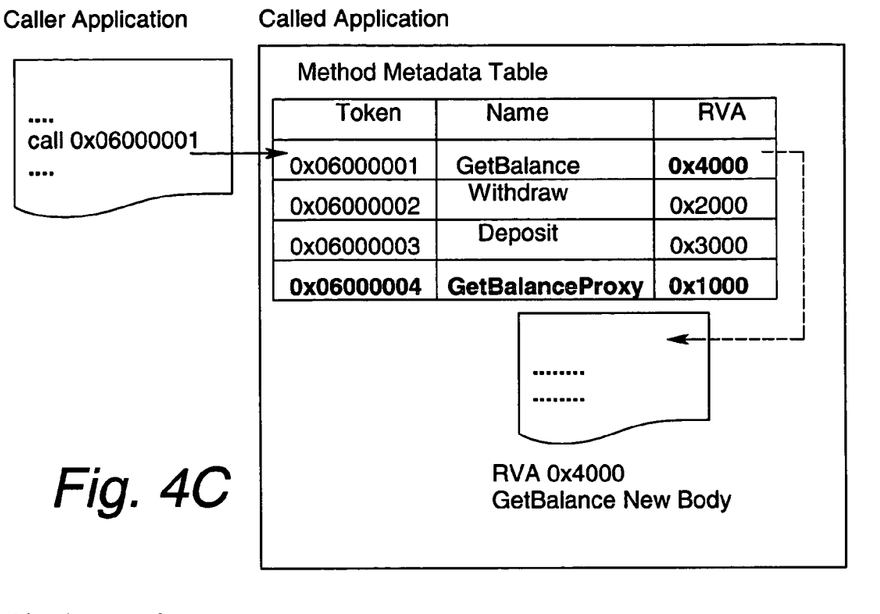

(ii) Defining a new method body for the method (i.e. GetBalance) being intercepted:

Referring to FIG. 4C, in order to intercept the method 0x06000001 i.e. GetBalance, then a "new method body" has to be created at runtime. This new method body for method GetBalance is created at runtime using the Interception Module 20i. The new method body gets assigned the value 0x4000. Then the method GetBalance's RVA is modified to the new method body i.e. 0x4000. (GetBalance New Body).

Figure 4D:
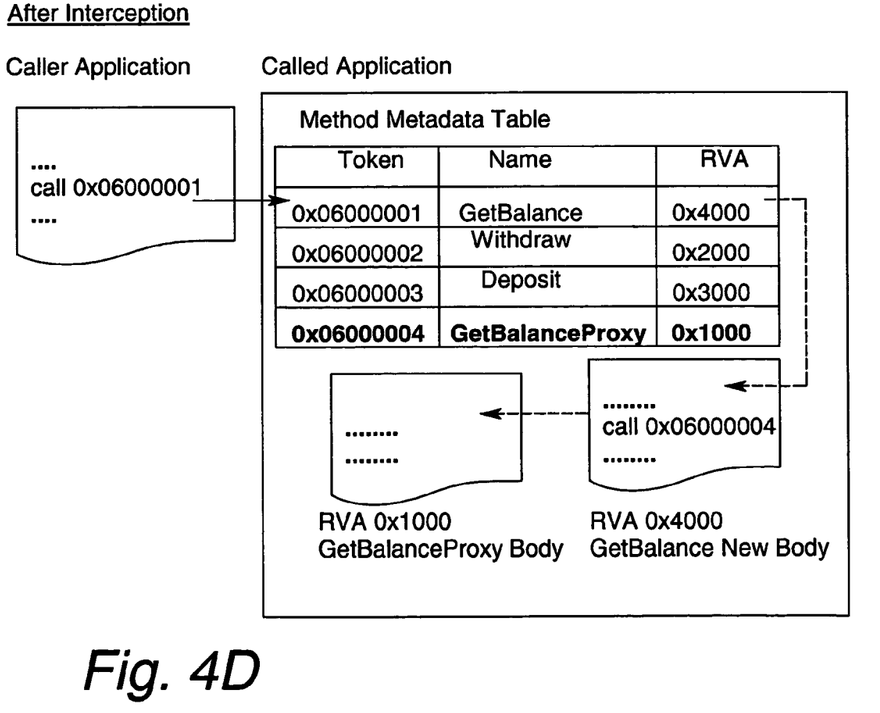
FIG. 4D is a drawing showing further details of .NET™ application runtime after the interception is effectuated.

Referring to FIG. 4D, after defining the new method GetBalanceProxy (FIG. 4C) and a new method body for the method GetBalance, the method "GetBalance" is "intercept enabled", which means the method is made ready to be intercepted, capable of being intercepted. In the method body of the method GetBalance the system can do additional work like preprocessing code, constraint checking, postprocessing code etc and also call GetBalanceProxy (which contains the code for the method GetBalance before being intercepted). The caller application with call 0x06000001 will transform to call 0x06000004 (GetBalance New Body) which then accesses RVA 0x1000 (Get Balance Proxy Body). This, then results in defining a new body for the method being intercepted.

Described herein has been a process whereby a .NET™ method in a .NET™ application can be intercepted for modification during runtime, without the need to modify the basic application or need to re-deploy the application.

As a result, many types of modifications can be enabled during runtime including such operations as changing thread priority, adjusting behavior of a method, change method parameters, and other modifications.

While one embodiment of the invention has been described, it should be understood that other variations of the invention may be developed which still fall within the scope of the attached claims.

What is claimed is:

1. A system utilizing a computer and memory wherein said system has a program, which instructs a processor to use an original caller application which enables modifying a selected method in a common language runtime environment during runtime with no need to re-deploy a chosen application that is using said method, the system comprising:
- (a) means to select said chosen application via a call from said original caller application;
- (b) means to extend said selected method in said chosen application;
- (c) interception means to intercept said call made to said selected method;
- (d) modification means for non-intrusively modifying said selected method so that useful code will affect how the program runs and can be inserted into a compiled application without having to recompile said application, the modification means comprising:
  - (i) means to define a proxy for said selected method,
  - (ii) means to create a new body for said proxy;
  - (iii) means to modify said method's new body in order to call said proxy to enable interception; and
  - (iv) means to non-intrusively modify said selected method using a special Debug Module to capture events and rewrite intermediate language code to machine language;
- (e) return means for returning the response from the modified, selected method to said original caller application.

2. The system, of claim 1 wherein the means to non-intrusively modify said selected method comprises:
- (A) means to provide a higher thread priority as a response to said selected method;
- (B) means to capture data about said selected method;
- (C) means to enforce selected constraints upon said selected method; and
- (D) means to modify parameters of said selected method.

3. In a common language runtime environment utilizing a processor and memory while running the common language runtime environment application, a method for intercepting a chosen application in order to extend the said chosen application at runtime without need to re-deploy the application, comprising the steps of:
- (a) locating a said common language runtime environment application during runtime and gaining access to said application's metadata;
- (b) selecting a chosen method of the said application for interception;
- (c) defining a proxy method for said chosen method having a method name by creating a new method entry in the method table of said application's metadata that mimics the said chosen method;
- (d) modifying non-intrusively said method name of the proxy method added in step (c) while using a special Debug Module to capture events, and rewrite the intermediate language code to machine language, the non-intrusive modification comprising:
  - (i) Modifying parameters of said chosen method;
  - (ii) Halting execution of said chosen method;
  - (iii) Applying user-defined exceptions to said chosen method;
  - (iv) Capturing data about said chosen method; and
  - (v) Enforcing selected constraints on said chosen method;
- (e) creating a new body for said chosen method and modifying the RVA (Relative Virtual Address) of the said chosen method; and
- (f) modifying said chosen method's new body in order to call said proxy method and facilitate additional work as desired.

4. The method of claim 3 wherein, step (f) includes operational work means which includes, but is not limited to, the steps of:
- (i) providing a higher thread priority to said chosen method;
- (ii) capturing about the data about said chosen method;
- (iii) enforcing selected constraints upon said chosen method;
- (iv) modifying parameters of said chosen method.

5. A specialized operating system utilizing a computer and memory wherein said system uses an original caller application which enables modifying a selected method in said specialized operating system platform at runtime with no need to redeploy a chosen application that is using said method, comprising:
- (a) means to select said chosen application via a call from said original caller application;
- (b) means to modify said selected method in said chosen application;
- (c) interception means to intercept said call made to said selected method;
- (d) modification means for modifying said selected method including:
  - (d1) means to capture events from said specialized operating system during runtime through use of a specialized Debug Module;
  - (d2) means, in said specialized operating system for locating said events which occur while the operating system's intermediate language is being converted to machine code;
  - (d3) means to capture events from the specialized operating system's runtime and through the operating system's Debug Module;
  - (d4) means to rewrite the special operating system's intermediate language when an event is captured;
  - (d5) means to add calls to said conditioning code around the selected method call;
  - (d6) means to convert the conditioning code to a machine language through use of the specialized operating system's intermediate language;
  - (d7) return means for returning a response from the modified selected method to said original caller application.

* * * * *